United States Patent [19]

Mery et al.

[11] Patent Number: 5,434,891
[45] Date of Patent: Jul. 18, 1995

[54] DATA TRANSFER ARRANGEMENT PERMITTING VARIABLE RATE DATA TRANSFER BETWEEN A MODEM AND A SYNCHRONOUS TERMINAL

[75] Inventors: Lionel Mery, Paris; Jean-Paul Guyon, Chaville; Jacqueline Catorc, Villejuif, all of France

[73] Assignee: U.S. Philips Corporation, New York, N.Y.

[21] Appl. No.: 259,936

[22] Filed: Jun. 14, 1994

Related U.S. Application Data

[63] Continuation of Ser. No. 890,629, May 20, 1992, abandoned.

[30] Foreign Application Priority Data

May 31, 1991 [FR] France ................. 9106588

[51] Int. Cl.⁶ .................. H04L 25/38; H04B 14/00
[52] U.S. Cl. .................. 375/377; 375/223; 370/84
[58] Field of Search ................. 375/7–10, 375/36, 121, 106; 370/84

[56] References Cited

U.S. PATENT DOCUMENTS

| | | | |
|---|---|---|---|
| 4,220,997 | 9/1980 | Hager | 395/250 |
| 4,288,860 | 9/1981 | Trost | 395/425 |
| 4,344,132 | 8/1982 | Dixon et al. | |
| 4,569,062 | 2/1986 | Dellande et al. | 375/9 |
| 4,737,722 | 4/1988 | Ramesh et al. | 375/8 |
| 4,802,189 | 1/1989 | Wedler | 340/84 |
| 4,841,561 | 6/1989 | Hill | 375/8 |

FOREIGN PATENT DOCUMENTS

| | | |
|---|---|---|
| 0031031 | 7/1981 | European Pat. Off. . |
| 2639895 | 3/1978 | Germany . |
| 63-120537 | 8/1988 | Japan . |

OTHER PUBLICATIONS

"Une Nouvelle Generation De Modems A Base De Circuits Integres A Grande Echelle" by J. C. Invernici, O. Le Riche et al., published in the journal Commutations et transmissions, No. 3, 1986.

Primary Examiner—Young Tse
Attorney, Agent, or Firm—Leroy Eason

[57] ABSTRACT

A data transfer arrangement by which variable-rate data transfer can be effected between a modem and a synchronous data terminal has a plurality of terminal-connected accesses. Namely, the first access for receiving data from the terminal, a second access for supplying clock signals to the terminal which fix the rate of the received data, a third access for supplying data to the terminal, and a fourth access for supplying clock signals to the terminal which fix the rate of the supplied data. Further accesses are connected via the modem to the transmission line for transmission and reception of data thereon at a uniform rate. A variable rate clock generator supplies clock signals to the second access, the clock rate being adjusted in accordance with the rate at which data is to be received from the data terminal.

3 Claims, 2 Drawing Sheets

DATA TRANSFER ARRANGEMENT PERMITTING VARIABLE RATE DATA TRANSFER BETWEEN A MODEM AND A SYNCHRONOUS TERMINAL

This is a continuation of application Ser. No. 07/890,629, filed May 20, 1992, now abandoned.

BACKGROUND OF THE INVENTION

1. Field of the Invention

The present invention relates to a system comprising a synchronous terminal, a data transfer arrangement which comprises a modem and permits transferring data between the modem and the synchronous terminal. The data transfer arrangement also comprises, on one hand, a plurality of terminal-connected accesses including a first access for receiving data from the terminal and a second access for supplying clock signals to the terminal for fixing the rate of the received data, and on the other hand accesses connected via the modem to the transmission line for transmitting the data at a uniform rate.

2. Description of the Related Art

A problem in data transmission systems is to adapt the data rate of the terminals to the data rate provided by a transmission line. With respect to this subject the Japanese document KOKAI 63-120537 may be consulted.

An obvious solution to this type of problem is to utilize an asynchronous operating mode according to which a terminal does not transmit until the data transfer arrangement gives it authorization. This mode is also well adapted to use of a modem with which data compression procedures are carried out, more specifically, those satisfying Recommendation V42A of the CCITT. In effect, the level of compression is variable depending on the nature of the data supplied by the terminal. For a transmission line whose rate is limited to 9600 bits per second, data supplied by the terminal at the rate of 19200 bits/s can thus be transmitted if the compression level is higher than two. However, if the compression level is lower than two, the speed of the terminal must be reduced. In the asynchronous mode influence is exerted on either:

(i) the flow of the data supplied to the modem, check bits $X_{ON}$ (authorization to transmit) or $X_{OFF}$ (prohibition to transmit) being included, or (ii) the junction circuit [106] (which circuit is defined in the CCITT Recommendations), so that it switches to the closed state to give the terminal authorization to transmit and switches to the open state to give the terminal a prohibition to transmit. These measures are not applicable when a synchronous type of terminal is concerned. The characteristics $X_{ON}$ and $X_{OFF}$ cannot be interpreted, because the terminal transmits and receives successive frames. Also, the junction circuit [106] then has a different meaning. An open state of this circuit generally causes the terminal to be disconnected.

SUMMARY OF THE INVENTION

According to the present invention, a data transfer arrangement is proposed which permits connecting a synchronous type of terminal that produces data at a variable rate so that the data can, in particular, undergo the procedures of data compression. Such an arrangement comprises a variable-rate clock circuit for supplying variable-rate clock signals to said second access as a function of the desired data rate of the terminal.

BRIEF DESCRIPTION OF THE DRAWINGS

The following description accompanied by the appended drawings, all as a non-limiting example, will explain how the invention may be realized. In the drawings.

DESCRIPTION OF THE PREFERRED EMBODIMENTS

Figure 1:
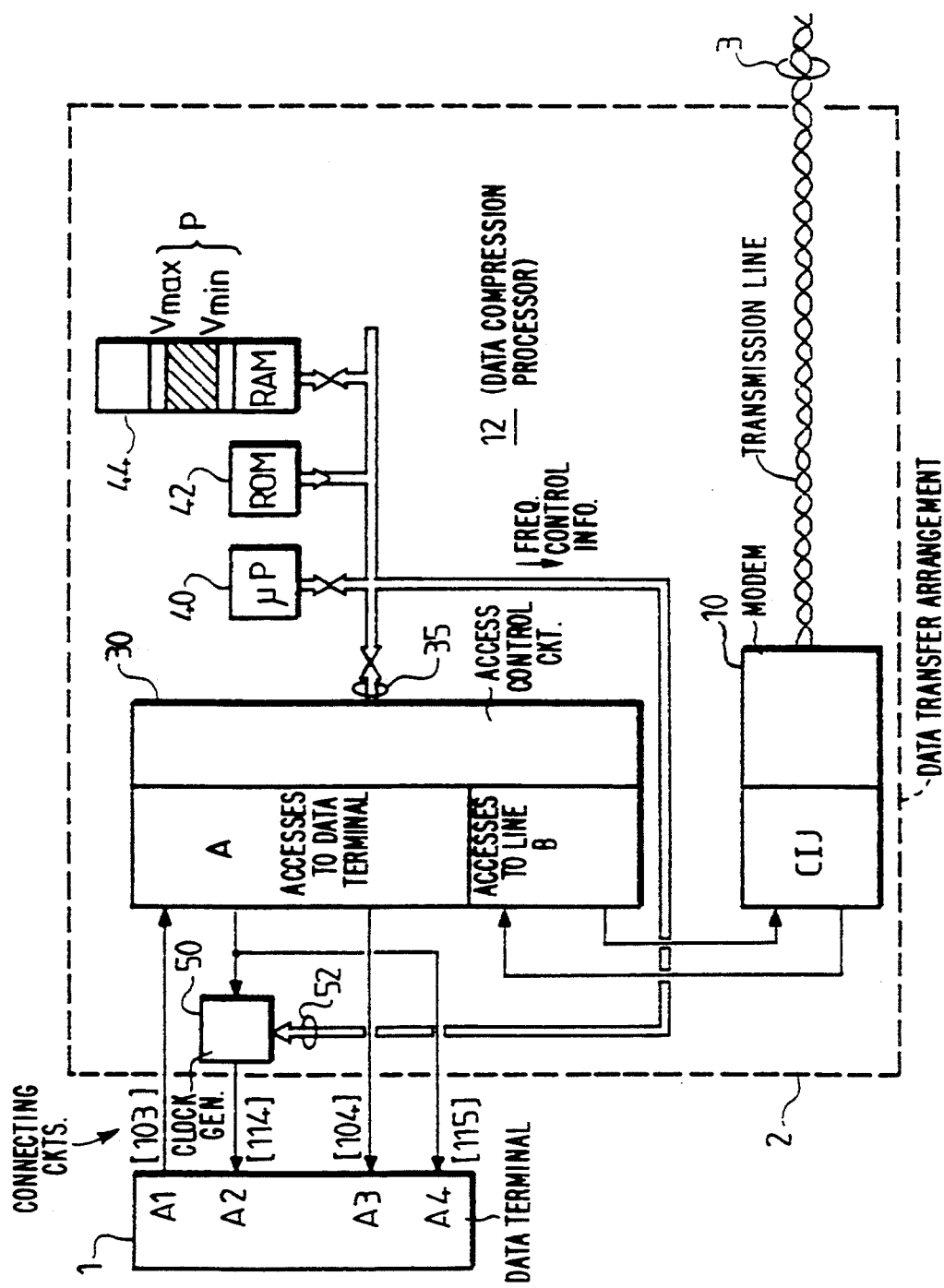
FIG. 1 shows a data transfer arrangement according to the invention.

In FIG. 1, the terminal is of the synchronous type. The data transfer arrangement 2 according to the invention ensures a fixed data rate for a telephone line 3. The terminal 1 is connected to the data transfer arrangement 2 by connecting circuits [103], [114], [104] and [115] as defined by the Recommendations of the CCITT and which are as follows:

[103]: circuit for data transfer from the terminal 1 to the arrangement 2,

[114]: circuit for clock signals fixing data rate of the circuit [103],

[104]: circuit for data transfer from the arrangement 2 to the terminal 1, and

[115]: circuit for producing clock signals defining the rate of the data supplied by the circuit [104].

These different connecting circuits are connected to the accesses A1, A2, A3 and A4 respectively, of the data terminal 1.

The data transfer arrangement 2 has a simple MODEM section 10 and a processing section 12 for performing a data compression procedure such as, for example, the one described in the advice V42A of Recommendations of the CCITF.

The section 10 is a modem circuit of the type described in the article entitled: "UNE NOUVELLE GENERATION DE MODEMS A BASE DE CIRCUITS INTEGRES A GRANDE ECHELLE" by J. C. INVERNICI, O. LE RICHE et at., published in the journal Commutations et transmissions, No. 3, 1986.

The processing section 12 comprises a series access control circuit 30 which may be a double communication meter of the Z85C30 type manufactured by Zilog. A section A of a circuit 30 comprises series accesses for the connection to the terminal 1, and a section B comprises series accesses for the connection to the modem circuit 10.

The parallel accesses 35 of the circuit 30 are connected to a processing ensemble comprising, more specifically, a microprocessor 40, a read-only memory 42 comprising the operating instructions of said ensemble, and a random access memory 44.

According to the invention a variable-rate clock circuit 50 is provided which is capable of supplying variable-rate clock signals to the access A2 of the terminal via the connecting circuit [114].

The different data to be transmitted coming from the terminal 1 are first put in a stack P arranged in the memory 44. The state of this which is susceptible to varying between a minimum value $V_{min}$ and a maximum value $V_{max}$, analyzed per program, determines the frequency of the clock signal to be applied by the clock circuit 50 to the connecting circuit [114]. The frequency determination information is transported to clock circuit 50 by a line 52. If it is found that the stack is diminishing and tends to approach the value $V_{min}$, a clock signal of higher frequency will be supplied by clock circuit 50 to connecting circuit [114]. If, on the contrary, the stack tends to approach the value $V_{max}$, the clock rate will be diminished. It should be observed that data terminals of the COMPAC series manufactured by T.R.T. well satisfy the necessary operating conditions of the connecting circuit [114].

Figure 2:
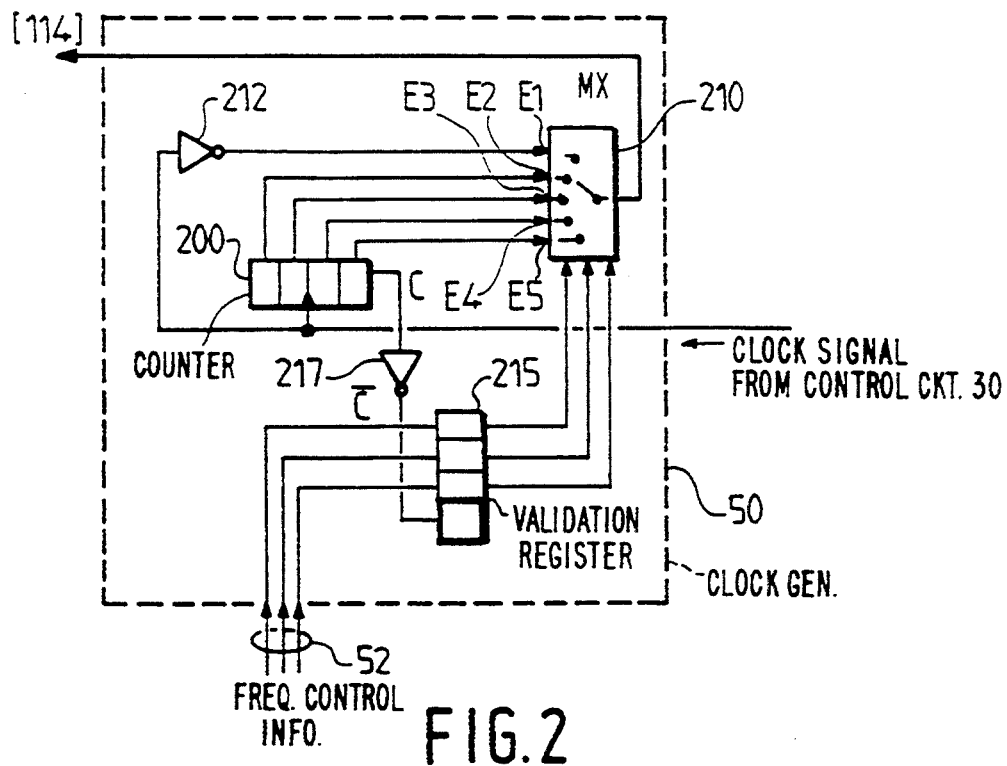
FIG. 2 shows a variable-rate clock circuit forming part of the arrangement in FIG. 1.

FIG. 2 is a detailed diagram of the clock circuit 50, which receives clock signals coming from the clock signal output of the access controller 30. These signals are applied to the count input of a counter 200 whose different outputs, representing division by 2, 4, 8, 16, are connected to the inputs E2, E3, EA and E5 of a multiplexer 210 of which another input E1 receives the complement of the clock signals received from series controller 30. This complement is produced by an inverter 212. The counter 200 has an output C for transmitting a carry signal to a clock frequency validation register 215 by way of an inverter 217, so that validation register 215 selects a clock frequency corresponding to the frequency control information transmitted by the wire 52 when the carry signal appears.

Figure 3:
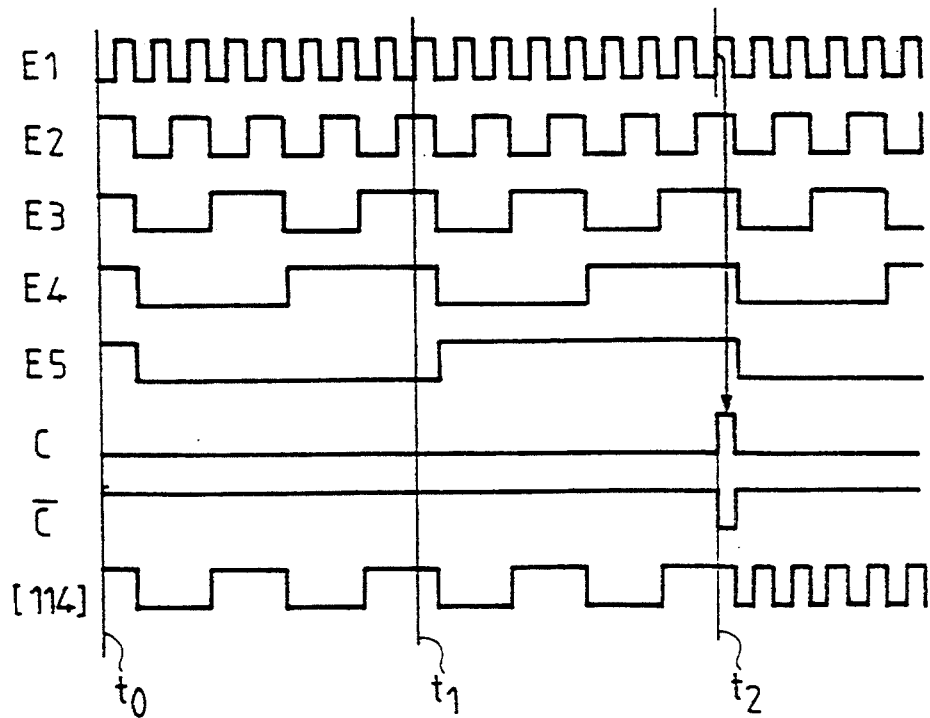
FIG. 3 is a time diagram relating to operation of the clock circuit shown in FIG. 2.

The operation of clock circuit 50 will be explained hereinbelow with the aid of the time diagram represented in FIG. 3. The signals referenced E1 to E5 correspond to those applied to the inputs of multiplexer 210 bearing the same references. The signal C is the carry signal from counter 200 and C its complementary signal. The signal formed at the output of clock circuit 50 bears the reference [114], since it is supplied to the connecting circuit in FIG. 1 bearing the same reference.

A start is made at instant $t_0$ where the output signal is such that:

[114]=E3

Thereafter, at the instant $t_1$ the frequency control signal transported by the line 52 calls for a higher rate clock signal such as E1 to be applied to the access [114]. In order to change the rate, the appearance of the carry signal is waited for. It appears at the instant $t_2$. At this instant all the output signals of the counter 200 have a well defined "1 value", for example, so that from that instant onwards the clock rate at the output [114] can be changed without causing an untimely transient phenomenon.

We claim:
1. Data transfer apparatus for effecting data transfer between a synchronous data terminal and a transmission line having a fixed preset data transmission rate, the data terminal being operative at a data rate determined by a clock frequency of clock signals supplied thereto, said data transfer apparatus comprising:
   access control means having first and second accesses for connection to said data terminal, the first access being for reception of data supplied by the data terminal and the second access being for supplying said clock signals to the data terminal;
   clock signal generating means coupled to the second access for providing said clock signals at a clock frequency which is adjustable;
   said access control means also having a plurality of further accesses for connection to said transmission line for transmitting data thereto and receiving data therefrom at said fixed preset data transmission rate; and
   data processing means coupled to said access control means for processing data received from said data terminal at said first access and supplying the processed received data to said access control means for transmission via the further accesses thereof to said transmission line, said data processing means also supplying a clock frequency control signal for adjusting the clock frequency of the clock signal generating means, thereby also adjusting the data rate of the data terminal, so that the data rate of processed received data produced by said data processing means will conform to said fixed preset data transmission rate.

2. Data transfer apparatus as claimed in claim 1, further comprising a modem for connecting the further accesses of said access control means to said transmission line.

3. Data transfer apparatus as claimed in claim 1, characterized in that the clock signal generating means comprises: a rate selection circuit for generating clock signals of selectably different rates; and a clock frequency validation register for receiving said clock frequency control signal and controlling said rate selection circuit to select a clock signal having a selected clock rate, wherein the selection of said clock signal being performed when all of the selectable clock rate signals produced by said rate selection circuit have well defined values.

* * * * *